(12) United States Patent
Smith et al.

(10) Patent No.: US 11,995,811 B1
(45) Date of Patent: May 28, 2024

(54) METHOD AND APPARATUS FOR DETERMINING A GROWTH FACTOR

(71) Applicant: Strategic Coach, Toronto (CA)

(72) Inventors: Barbara Sue Smith, Toronto (CA); Daniel J. Sullivan, Toronto (CA)

(*) Notice: Subject to any disclaimer, the term of this patent is extended or adjusted under 35 U.S.C. 154(b) by 0 days.

(21) Appl. No.: 18/142,845

(22) Filed: May 3, 2023

(51) Int. Cl.
*G06T 7/00* (2017.01)
*G06T 3/40* (2006.01)

(52) U.S. Cl.
CPC .............. *G06T 7/0002* (2013.01); *G06T 3/40* (2013.01); *G06T 2207/20081* (2013.01)

(58) Field of Classification Search
CPC ......... G06F 21/32; G06F 21/31; G06V 10/82; G06V 40/1365; G06V 40/12; G06V 40/1388; G06V 40/1347
See application file for complete search history.

(56) References Cited

U.S. PATENT DOCUMENTS

| | | | | |
|---|---|---|---|---|
| 2009/0323537 | A1* | 12/2009 | Yamamoto | H04L 43/0811 370/242 |
| 2018/0137329 | A1* | 5/2018 | Kim | G06V 10/50 |
| 2019/0066089 | A1* | 2/2019 | Miryala | G06Q 20/367 |
| 2020/0082918 | A1* | 3/2020 | Simhon | G06Q 40/06 |
| 2020/0410206 | A1* | 12/2020 | Reynolds | G06V 10/98 |
| 2021/0049249 | A1* | 2/2021 | Falardeau | G06F 21/32 |
| 2021/0201202 | A1* | 7/2021 | Simhon | G06N 3/008 |
| 2023/0185360 | A1* | 6/2023 | Sangiovanni | A61B 5/7282 600/300 |

OTHER PUBLICATIONS

Geoff Wilson (https://www.linkedin.com/pulse/why-your-app-needs-short-session-timeout-google-facebook-geoff-wilson, published Jun. 6, 2017 (Year: 2017).*
Muteki, De-risking Scale-up of a High Shear Wet Granulation Process Using Latent Variable Modeling and Near Infrared Spectroscopy, Aug. 6, 2011, Science Direct: Computer Aided Chemical Engineering, p. 144-156.
Game, Application of Machine Learning to support production planning of a food industry in the context of waste generation under uncertainty, Feb. 22, 2020, Science Direct: Operations Research Perspectives, Application of Machine Learning to support production planning of a food industry in the context of waste generation under uncertainty, p. 1-8.
Abbasi, Predicting solutions of large-scale optimization problems via machine learning: A case study in blood supply chain management, Jul. 2020, Science Direct: Computers & Operations Research, p. 1-14.

* cited by examiner

*Primary Examiner* — Li Liu
(74) *Attorney, Agent, or Firm* — Caldwell Intellectual Property Law

(57) ABSTRACT

An apparatus and method for determining a growth factor. The method may include receiving, by a processor, entity data and determining, by the processor, a growth factor. Further, the method may include generating, by the processor, at least an interface element as a function of the growth factor and transmitting, by the processor, the at least an interface element to a graphical user interface (GUI).

20 Claims, 8 Drawing Sheets

METHOD AND APPARATUS FOR DETERMINING A GROWTH FACTOR

FIELD OF THE INVENTION

The present invention generally relates to the field of artificial intelligence. In particular, the present invention is directed to a method and apparatus for determining a growth factor.

BACKGROUND

As systems grow, they may become complex. As such, processes and structures that operate well within systems at one level of scale can become inadequate at larger scales; existing automated models do not account for this sufficiently well.

SUMMARY OF THE DISCLOSURE

In an aspect an apparatus for determining a growth factor may include at least a processor; and a memory communicatively connected to the at least a processor, the memory containing instructions configuring the at least a processor to receive entity data. The processor may be configured to determine a growth factor and generate at least an interface element as a function of the growth factor. Further, the processor may be configured to transmit the at least an interface element to a graphical user interface (GUI).

In another aspect a method for determining a growth factor may include receiving, by a processor, entity data and determining, by the processor, a growth factor. Further, the method may include generating, by the processor, at least an interface element as a function of the growth factor. Moreover, the method may include transmitting, by the processor, the at least an interface element to a graphical user interface (GUI).

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for determining a growth factor. In an embodiment, determining a growth factor may include utilizing a machine-learning process. Exemplary embodiments illustrating aspects of the present disclosure are described below in the context of several specific examples.

Figure 1:
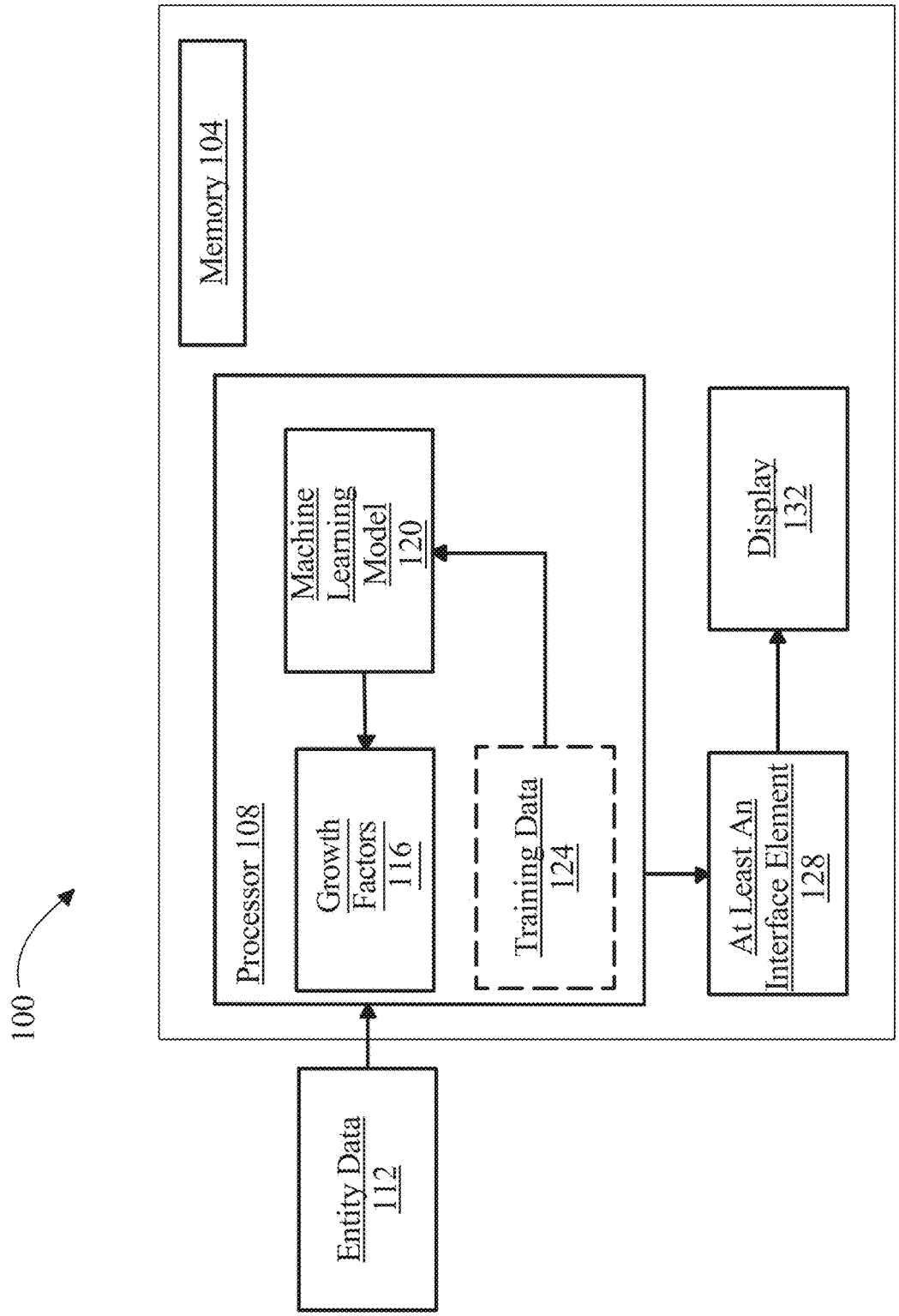
FIG. 1 is a block diagram of an exemplary embodiment of an apparatus for determining a growth factor.

Referring now to FIG. 1, an exemplary embodiment of an apparatus 100 for routine improvement for an entity is illustrated. Apparatus may include a memory. Apparatus may include a processor. Processor may include, without limitation, any processor described in this disclosure. Apparatus may include any apparatus as described in this disclosure, including without limitation a microcontroller, microprocessor, digital signal processor (DSP) and/or system on a chip (SoC) as described in this disclosure. Apparatus may include, be included in, and/or communicate with a mobile device such as a mobile telephone or smartphone. Apparatus may include a single apparatus operating independently, or may include two or more apparatus operating in concert, in parallel, sequentially or the like; two or more apparatus s may be included together in a single apparatus or in two or more apparatus s. Apparatus may interface or communicate with one or more additional devices as described below in further detail via a network interface device. Network interface device may be utilized for connecting apparatus to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two apparatus s, and any combinations thereof. A network may employ a wired and/or a wireless mode of communication. In general, any network topology may be used. Information (e.g., data, software etc.) may be communicated to and/or from a computer and/or an apparatus. Apparatus may include but is not limited to, for example, an apparatus or cluster of apparatus s in a first location and a second apparatus or cluster of apparatus s in a second location. Apparatus may include one or more apparatus s dedicated to data storage, security, distribution of traffic for load balancing, and the like. Apparatus may distribute one or more computing tasks as described below across a plurality of apparatus s of apparatus, which may operate in parallel, in series, redundantly, or in any other manner used for distribution of tasks or memory between apparatus. Apparatus may be implemented, as a non-limiting example, using a "shared nothing" architecture.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may receive an entity data 112. As used in this disclosure, "entity data" is data associated with an entity of interest. In some embodiments, entity data 112 may include a user, or a company associated with a user. Entity data may include, for example, data describing the company's financial projections, data describing the company's business model, data describing company employees, data describing the user, and data describing other entities in the company's industry. In some embodiments, entity data 112 may include financial data, such as current financial data associated with the entity. Financial data may include, for example, revenue of a company, profit of a company, and income of a user. Financial data may be received, for example, from a company's internal auditing process or from a public company's financial reports. In some embodiments, entity data 112 may be collected via direct user textile input, a web crawler, speech recognition, or the like. As a non-limiting example, entity data 112 may include an analysis of user speech. Speech data may be collected, for example, by prompting a user to discuss an entity and recording user speech, or by searching online (e.g., social media sites) for spoken discussions of an entity. User speech may be analyzed to determine, for example, the level of excitement or confidence the user feels about the company. Machine learning may be used to analyze user speech. Machine learning model may be any suitable machine learning model as mentioned in this disclosure. A machine learning model may be trained on historical speech samples tagged with, for example, confidence and excitement ratings. A machine learning model may use a speech recording as an input and may output confidence and excitement ratings.

With continued reference to FIG. 1, in some embodiments, apparatus 100 may include a language processing module to process entity data 112. A language processing module may include any hardware and/or software module. A language processing module may be configured to extract, from one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, a language processing module may operate to produce a language processing model. A language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, a language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs has used herein are statistical models with inference algorithms that that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing module may use a corpus of documents to generate associations between language elements in a language processing module, and diagnostic engine may then use such associations to analyze words extracted from one or more documents and determine that the one or more documents indicate significance of a category. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York. In some embodiments, apparatus 100 may determine one or more characters, symbols, strings, phrases, and the like of user input. Apparatus 100 may determine one or more characters, symbols, strings, phrases, and the like using a language processing module as described above. Apparatus 100 may compare determined text of user input and/or other input through comparing received input, such as user input, to one or more databases. Databases may include, without limitation, warehouse management systems, websites, and the like.

With continued reference to FIG. 1, entity data 112 may include information such as and without limitations, age, gender, marital and/or family status, previous work history, previous education history and the like. In some embodiments, entity data 112 may be received through an input device. In some instances, input device may include apparatus 100. In some instances, input device may include a remote device. In instances where entity data 112 is input into a remote input device, remote device may transmit entity data 112 across a wireless connection. In some embodiments, wireless connection may be any suitable connection (e. g., radio, cellular). In some instances, input device may include a computer, laptop, smart phone, tablet, or things of the like. In some instances, entity data 112 may be stored in a data store and associated with an entity account. It should be noted that data store may be accessed by any input device, using authorization credentials associated with entity data 112. In some instances, entity data 112 may be created and stored via a laptop and accessed from tablet, using authorization credentials.

With continued reference to FIG. 1, apparatus 100 may receive entity data 112 at processor 108. In some embodiments, processor 108 may have formatting requirements to ensure efficient processing and output of data from processor 108. Keeping that in mind, apparatus 100 may utilize processor 108 to perform pre-processing on entity data 112. It should be noted that processor 108 may perform pre-processing for any data input to apparatus 100. Methods of pre-processing may include interpolation processes as discussed in more detail below.

Still referring to FIG. 1, processor 108 may use interpolation and/or up sampling methods to process entity data 112. For instance, where authentication credentials include image data, processor 108 may convert a low pixel count image into a desired number of pixels need to for input into an image classifier; as a non-limiting example, an image classifier may have a number of inputs into which pixels are input, and thus may require either increasing or decreasing the number of pixels in an image to be input and/or used for training image classifier, where interpolation may be used to increase to a required number of pixels. As a non-limiting example, a low pixel count image may have 100 pixels, however a number of pixels needed for an image classifier may be 128. Processor 108 may interpolate the low pixel count image to convert the 100 pixels into 128 pixels so that a resultant image may be input into an image classifier. It should be noted that image classifier may be any classifier as described in this disclosure. It should also be noted that one of ordinary skill in the art, upon reading this disclosure, would know the various methods to interpolate a low pixel count image to a desired number of pixels required by an image classifier. In some instances, a set of interpolation rules may be trained by sets of highly detailed images and images that may have been down sampled to smaller numbers of pixels, for instance and without limitation as described below, and a neural network or other machine learning model that is trained using the training sets of highly detailed images to predict interpolated pixel values in a facial picture context. As a non-limiting example, a sample picture with sample-expanded pixels (e.g., pixels added between the original pixels) may be input to a neural network or machine-learning model and output a pseudo replica sample-picture with dummy values assigned to pixels between the original pixels based on a set of interpolation rules. In some instances, image classifier and/or another machine-learning model may have a set of interpolation rules trained by sets of highly detailed images and images that have been down sampled to smaller numbers of pixels, and a neural network or other machine learning model that is trained using those examples to predict interpolated pixel values in a facial picture context. I.e., you run the picture with sample-expanded pixels (the ones added between the original pixels, with dummy values) through this neural network or model and it fills in values to replace the dummy values based on the rules.

Still referring to FIG. 1, processor 108 may utilize sample expander methods, a low-pass filter, or both. As used in this disclosure, a "low-pass filter" is a low-pass filter is a filter that passes signals with a frequency lower than a selected cutoff frequency and attenuates signals with frequencies higher than the cutoff frequency. The exact frequency response of the filter depends on the filter design. In some embodiments, processor 108 may use luma or chroma averaging to fill in pixels in between original image pixels. Processor 108 may down-sample image data to a lower number of pixels to input into an image classifier. As a non-limiting example, a high pixel count image may have 356 pixels, however a number of pixels needed for an image classifier may be 128. Processor 108 may down-sample the high pixel count image to convert the 356 pixels into 128 pixels so that a resultant image may be input into an image classifier.

In some embodiments, and with further reference to FIG. 1, processor may be configured to perform down sampling on data such as without limitation image data. For instance, and without limitation, where an image to be input to image classifier, and/or to be used in training examples, has more pixel than a number of inputs to such classifier. Down sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Continuing to refer to FIG. 1, any training data described in this disclosure may include two or more sets of image quality-linked training data. "Image quality-linked" training data, as described in this disclosure, is training data in which each training data element has a degree of image quality, according to any measure of image quality, matching a degree of image quality of each other training data element, where matching may include exact matching, falling within a given range of an element which may be predefined, or the like. For example, a first set of image quality-linked training data may include images having no or extremely low blurriness, while a second set of image quality-linked training data. In an embodiment, sets of image quality-linked training data may be used to train image quality-linked machine-learning processes, models, and/or classifiers as described in further detail below. In some embodiments, training data may include two or more sets of image quality-linked training data. "Image quality-linked" training data, as described in this disclosure, is training data in which each training data element has a degree of image quality, according to any measure of image quality, matching a degree of image quality of each other training data element, where matching may include exact matching, falling within a given range of an element which may be predefined, or the like. For example, a first set of image quality-linked training data may include images having no or extremely low blurriness, while a second set of image quality-linked training data. In an embodiment, sets of image quality-linked training data may be used to train image quality-linked machine-learning processes, models, and/or classifiers as described in further detail below.

Still referring to FIG. 1, training data, images, and/or other elements of data suitable for inclusion in training data may be stored, without limitation, in an image database. Image database may include any data structure for ordered storage and retrieval of data, which may be implemented as a hardware or software module. Image database may be implemented, without limitation, as a relational database, a key-value retrieval datastore such as a NOSQL database, or any other format or structure for use as a datastore that a person skilled in the art would recognize as suitable upon review of the entirety of this disclosure. An image database may include a plurality of data entries and/or records corresponding to user tests as described above. Data entries in an image database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in an image database may reflect categories, cohorts, and/or populations of data consistently with this disclosure. Image database may be located in memory 104 or on another device in and/or in communication with apparatus 100.

Still referring to FIG. 1, an exemplary embodiment of an image database is illustrated. One or more tables in image database may include, without limitation, an image table, which may be used to store images, with links to origin points and/or other data stored in image database and/or used in training data as described in this disclosure. Image database may include an image quality table, where categorization of images according to image quality levels, for instance for purposes of use in image quality-linked training data, may be stored. Image database may include a demographic table; demographic table may include any demographic information concerning users from which images were captured, including without limitation age, sex, national origin, ethnicity, language, religious affiliation, and/or any other demographic categories suitable for use in demographically linked training data as described in this disclosure. Image database may include an anatomical feature table, which may store types of anatomical features, including links to diseases and/or conditions that such features represent, images in image table that depict such features, severity levels, mortality and/or morbidity rates, and/or degrees of acuteness of associated diseases, or the like. Persons skilled in the art, upon reviewing the entirety of this disclosure, will be aware of various alternative or additional data which may be stored in image database.

Referring still to FIG. 1, training data, images, and/or other elements of data suitable for inclusion in training data may be stored, without limitation, in an image database. Image database may include any data structure for ordered storage and retrieval of data, which may be implemented as a hardware or software module. Image database may be implemented, without limitation, as a relational database, a key-value retrieval datastore such as a NOSQL database, or any other format or structure for use as a datastore that a person skilled in the art would recognize as suitable upon review of the entirety of this disclosure. An image database may include a plurality of data entries and/or records corresponding to entity tests as described above. Data entries in an image database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in an image database may reflect categories, cohorts, and/or populations of data consistently with this disclosure. Image database may be located in memory 104 of apparatus 100 and/or on another device in and/or in communication apparatus 100.

Still referring to FIG. 1, an exemplary embodiment of an image database is illustrated. One or more tables in image database may include, without limitation, an image table, which may be used to store images, with links to origin points and/or other data stored in image database and/or used in training data as described in this disclosure. Image database may include an image quality table, where categorization of images according to image quality levels, for instance for purposes of use in image quality-linked training data, may be stored. Image database may include a demographic table; demographic table may include any demographic information concerning users from which images were captured, including without limitation age, sex, national origin, ethnicity, language, religious affiliation, and/or any other demographic categories suitable for use in demographically linked training data as described in this disclosure. Image database may include an anatomical feature table, which may store types of anatomical features, including links to diseases and/or conditions that such features represent, images in image table that depict such features, severity levels, mortality and/or morbidity rates, and/or degrees of acuteness of associated diseases, or the like. Persons skilled in the art, upon reviewing the entirety of this disclosure, will be aware of various alternative or additional data which may be stored in image database.

Still referring to FIG. 1, processor 108 may receive entity data 112 that may include authorization image data. Image data may include pixel data of varying range. In instances where authorization image data does not match stored pixel data, processor 108 may transform authorization image data to stored pixel data. In some embodiments, pre-processing entity data 112 may include processor 108 may compare entity profile image data to stored pixel data. In some instances, entity profile image data may be transformed from its original state. Processor 108 may compare original entity profile image data to stored pixel data. Entity profile image data may differ in pixel count, thus, only a percentage of pixel data may match up. As a non-limiting example, at least 90 percent of pixel data may match. It should be noted that a percent match may be at least 95 percent, at least 90 percent, at least 80 percent, or the like. Processor may flag any entity that sends entity data 112 that have less than the specified amount of pixel data matchup.

Still referring to FIG. 1, entity data 112 may be digital signatures. As a non-limiting example, entity may use a device capable of fingerprinting. In some instances, entity data 112 may be a digital fingerprint. In some embodiments, digital fingerprint may be a digital scan of entity finger, face, or any identifying feature. Digital fingerprint may be stored in a database and retrieved upon processor 108 receiving entity data 112 from an entity user device. Digital fingerprint received from entity may be compared to a stored fingerprint associated with entity using methods described above. In some instances, digital fingerprint may be an image of an identifying feature. A certainty percentage threshold may be lower for an image of identifying feature in comparison to a digital fingerprint to account for confounding variables including but not limited to camera quality, formatting, transmission packet loss, or the like.

Still referring to FIG. 1, determining apparatus 100 identifier may include identifying device fingerprint data of apparatus 100 and determining the apparatus 100 identifier from the device fingerprint data. "Device fingerprint data," as used in this disclosure, is data used to determine a probable identity of a device as a function of at least a field parameter a communication from the device. At least a field parameter may be any specific value set by apparatus 100 and/or user thereof for any field regulating exchange of data according to protocols for electronic communication. As a non-limiting example, at least a field may include a "settings" parameter such as SETTINGS_HEADER_TABLE_SIZE,_SETTINGS_ENABLE_PUSH, SETTINGS_MAX_CONCURRENT_STREAMS,_SETTINGS_INITIAL_WINDOW_SIZE, SETTINGS_MAX_FRAME_SIZE,_SETTINGS_MAX_HEADER_LIST_SIZE, WINDOW_UPDATE,_WINDOW_UPDATE,_WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," 'transaction_id," and the like. Determining the identity of the apparatus 100 may include fingerprinting the apparatus 100 as a function of at least a machine operation parameter described a communication received from the apparatus 100. At least a machine operation parameter, as used herein, may include a parameter describing one or more metrics or parameters of performance for a device and/or incorporated or attached components; at least a machine operation parameter may include, without limitation, clock speed, monitor refresh rate, hardware or software versions of, for instance, components of apparatus 100, a browser running on apparatus 100, or the like, or any other parameters of machine control or action available in at least a communication. In an embodiment, a plurality of such values may be assembled to identify apparatus 100 and distinguish it from other devices.

With continued reference to FIG. 1, determining the apparatus 100 identifier may include receiving a digital signature from apparatus 100 and determining the apparatus 100 identifier from the digital signature. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, determining apparatus 100 identifier may include receiving a token issued by one or more third-party devices or services identifying and/or authenticating apparatus 100 and/or a user thereof, such as without limitation security assertions markup language (SAML) token from apparatus 100 and determining the apparatus 100 identifier from the SAML token. SAML) tokens are extensible markup language (XML) representations carrying statements that are sets of claims made by one entity about another entity. For example, in federated security scenarios, statements may be made by a security token service about a user and/or device in a system. A security token service may sign the SAMI, token, for instance using any digital signature as described above, to indicate veracity of statements contained in the token. In addition, a SAML token may be associated with secret data, such as cryptographic key material that the user of the SAMI token may knowledge of, for instance using a digital circuit as described above. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Still referring to FIG. 1, data elements may be listed in an immutable sequential listing; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion. In an embodiment, collection of textual data states that the owner of a certain transferable item represented in a digitally signed assertion register is transferring that item to the owner of an address. A digitally signed assertion 304 may be signed by a digital signature created using the private key associated with the owner's public key, as described above.

Still referring to FIG. 1, a digitally signed assertion may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion may describe the transfer of a physical good; for instance, a digitally signed assertion may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 1, in one embodiment, an address is a textual datum identifying the recipient of virtual currency or another item of value in a digitally signed assertion. In some embodiments, address is linked to a public key, the corresponding private key of which is owned by the recipient of a digitally signed assertion. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion may record a subsequent a digitally signed assertion transferring some or all of the value transferred in the first a digitally signed assertion to a new address in the same manner. A digitally signed assertion may contain textual information that is not a transfer of some item of value in addition to, or as an alternative to, such a transfer. For instance, as described in further detail below, a digitally signed assertion may indicate a confidence level associated with a distributed storage node as described in further detail below.

In an embodiment, and still referring to FIG. 1 immutable sequential listing records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 1, immutable sequential listing may preserve the order in which the at least a posted content took place by listing them in chronological order; alternatively or additionally, immutable sequential listing may organize digitally signed assertions into sub-listings such as "blocks" in a blockchain, which may be themselves collected in a temporally sequential order; digitally signed assertions within a sub-listing may or may not be temporally sequential. The ledger may preserve the order in which at least a posted content took place by listing them in sub-listings and placing the sub-listings in chronological order. The immutable sequential listing may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 4161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 1, immutable sequential listing, once formed, may be inalterable by any party, no matter what access rights that party possesses. For instance, immutable sequential listing may include a hash chain, in which data is added during a successive hashing process to ensure non-repudiation. Immutable sequential listing may include a block chain. In one embodiment, a block chain is immutable sequential listing that records one or more new at least a posted content in a data item known as a sub-listing or "block." An example of a block chain is the BITCOIN block chain used to record BITCOIN transactions and values. Sub-listings may be created in a way that places the sub-listings 308 in chronological order and link each sub-listing to a previous sub-listing in the chronological order so that any computing device may traverse the sub-listings in reverse chronological order to verify any at least a posted content listed in the block chain. Each new sub-listing may be required to contain a cryptographic hash describing the previous sub-listing. In some embodiments, the block chain contains a single first sub-listing sometimes known as a "genesis block."

Still referring to FIG. 1, the creation of a new sub-listing may be computationally expensive; for instance, the creation of a new sub-listing may be designed by a "proof of work" protocol accepted by all participants in forming the immutable sequential listing to take a powerful set of computing devices a certain period of time to produce. Where one sub-listing takes less time for a given set of computing devices to produce the sub-listing protocol may adjust the algorithm to produce the next sub-listing so that it will require more steps; where one sub-listing takes more time for a given set of computing devices to produce the sub-listing protocol may adjust the algorithm to produce the next sub-listing so that it will require fewer steps. As an example, a protocol may require a new sub-listing to contain a cryptographic hash describing its contents; the cryptographic hash may be required to satisfy a mathematical condition, achieved by having the sub-listing contain a number, called a nonce, whose value is determined after the fact by the discovery of the hash that satisfies the mathematical condition. Continuing the example, the protocol may be able to adjust the mathematical condition so that the discovery of the hash describing a sub-listing and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing according to the protocol is known as "mining." The creation of a new sub-listing may be designed by a "proof of stake" protocol as will be apparent to those skilled in the art upon reviewing the entirety of this disclosure.

Continuing to refer to FIG. 1, in some embodiments, protocol also creates an incentive to mine new sub-listings. The incentive may be financial; for instance, successfully mining a new sub-listing may result in the person or entity that mines the sub-listing receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings each sub-listing created in immutable sequential listing may contain a record or at least a posted content describing one or more addresses that receive an incentive, such as virtual currency, as the result of successfully mining the sub-listing.

With continued reference to FIG. 1, where two entities simultaneously create new sub-listings, immutable sequential listing may develop a fork; protocol may determine which of the two alternate branches in the fork is the valid new portion of the immutable sequential listing by evaluating, after a certain amount of time has passed, which branch is longer. "Length" may be measured according to the number of sub-listings in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing.

Still referring to FIG. 1, additional data linked to at least a posted content may be incorporated in sub-listings in the immutable sequential listing; for instance, data may be incorporated in one or more fields recognized by block chain protocols that permit a person or computer forming a at least a posted content to insert additional data in the immutable sequential listing. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 1, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings in a block chain computationally challenging; the incentive for producing sub-listings may include the grant of new crypto-currency to the miners. Quantities of crypto-currency may be exchanged using at least a posted content as described above. In some embodiments, data may be stored on a blockchain. In some instances, updates to data may also be stored on blockchain.

With continued reference to FIG. 1, processor 108 may receive an IP address associated with a known location of entity. Entity data 112 may include IP address. In some embodiments, IP address may be appended to any data packet containing entity data 112 data. In some instances, time elapsed during data transmission may be used to authenticate entity. As a non-limiting example, time elapsed may be the time it takes for a data packet to be transmitted between a computing device associated with entity and processor 108. In some embodiments, time elapsed may be the time it takes for a first data packet to be transmitted from a computing device associated with entity to processor 108 and a second data packet transmitted from processor 108 to entity. Processor 108 may authenticate entity as a function of time elapsed by comparing actual time elapsed to an expected time elapsed. Expected time elapsed may be calculated as function of network latency, expected data packet size, and the like. In instances of fraud attempts, processor 108 may determine that time elapsed is below a certainty percentage threshold as described above. As a non-limiting example, a spoof account may be located in different location than entity. Therefore, data packet transmission may take more or less time than expected. Accordingly, processor 108 may flag spoof account as fraudulent. In some instances, a fraudulent verifier may use a proxy server to attempt to authenticate themselves. Data packet transmission may take more or less time than expected. Accordingly, processor 108 may flag fraudulent verifier as fraudulent. It should be noted that IP addresses associated with flagged accounts may be stored in a database to preserve computational resources if multiple fraudulent attempts come from the same account. As a non-limiting example, processor 108 may receive fraudulent entity data 112 data packet with a flagged IP address appended to the data packet. Processor 108 may compare the data packet to stored flagged IP addresses. If the IP address appended to the data packet matches a stored flagged IP address, processor 108 may not authenticate verifier. It should be noted that flagged IP addresses may be added manually by a user, a third-party, source, or both.

Still referring to FIG. 1, processor 108 may determine a growth factor 116. As used in this disclosure, "growth factor" is a characteristic or feature of an entity that limits ability to grow; limit of ability to grow may be a result of previous growth, additional factors that affect growth as an entity becomes larger, or the like. In some embodiments, a product design, a feature of an entity, or a process for manufacturing an entity's product may limit the entity's efficiency as the entity grows. For example, growth factor may limit high quantity production, high quality production, fast transport, increased advertisement, research and development, revenue, profit, workforce, and things of the like. In some embodiments, growth factor 116 may include a single characteristic. In another embodiment, growth factor 116 may include a combination of characteristics. As a non-limiting example, growth factor 116 may include a manufacturer not being able to produce a desired volume. In another non-limiting example, growth factor may include a wholesaler having an insufficient amount of material in combination with a manufacturer not being able to produce a desired volume. In some embodiments, growth factor may include temporal element. In some instances, an entity may review different factors that enabled entity's growth in the past. Temporal element may include a historical time element (e.g., 1 month ago, 2 months ago, 6 months ago, 1 year ago). In some instances, growth factor may include a combination of factors in view of a timing element. For instance, growth factor may include factors that assisted entity grow their enterprise, business, operation, or the like by a certain amount (e.g., 2-fold, 5-fold, 10-fold). In some embodiments, growth factor may be indicative of principles (i.e., behaviors, activities, methodologies). In some embodiments, identifying a growth factor may include utilizing a machine learning process and/or model as described in further detail below. Utilizing machine learning model may include inputs, including but not limited to, a size of entity, past growth of entity, unique ability, or things of the like, to output a growth factor. A unique ability may be described in further detail in U.S. patent application Ser. No. 18/141,725, entitled "APPARATUS AND A METHOD FOR HIGHER-ORDER GROWTH MODELING," the entirety of which is incorporated by reference. Growth and scaling predictions, and methods therefor, may be described in further detail in U.S. patent application Ser. No. 18/141,296, entitled "SYSTEMS AND METHODS FOR DATA STRUCTURE GENERATION," the entirety of which is incorporated by reference.

Still referring to FIG. 1, processor 108 may include identifying an entity process. As used in this disclosure, an "entity process" is a series of steps an entity performs to produce a desired product. In some embodiments, entity process may include multiple steps performed by multiple third-party sources. As a non-limiting example, entity process may include a prototyping step, a manufacturing step, and a selling step. Each of the three steps may be performed by distinct, third-party sources. In some embodiments, each step of the entity process may be performed by entity themselves. In some instances, entity performing entity process may reduce financial and time considerations associated with performing entity process. In some embodiments, determining growth factor 116 may include comparing financial and time considerations for each step of entity process to industry standard as a function of various parameters. In some embodiments, various parameters may include, but are not limited to, geolocation, industry type, time of year, current economic situation, or things of the like.

Still referring to FIG. 1, processor 108 may receive transport data associated with a step of entity process. For the purposes of this disclosure, "transport data" is information pertaining to a transport. Transport data may include, without limitation, origins, destinations, geographical data, estimated delivery times, estimated costs, and the like. Geographical data may include, without limitation, GPS coordinates, altitude, longitude, latitude, and the like. In some embodiments, geographical data may include relative location data. "Relative location data" as used in this disclosure is information pertaining to a particular geographical point. Relative location data may include, for instance and without limitation, distances between two or more geographical points, closest points of interest, and the like. A "transport", for the purposes of this disclosure, is a movement of one or more objects between two or more locations. Thus, a transport, such as transport, includes a transportation of cargo. For instance, and without limitation, a means of transport includes one or more processes of moving cargo, such as from one location (e.g., an origin) to another location (e.g., a destination) using a transport vehicle. Transport may include, without limitation, transport vehicles, transport components, and the like. "Transport vehicles" as used in this disclosure are devices configured to provide locomotive capabilities. Transport vehicles may include, without limitation, cars, trucks, motorcycles, boats, planes, drones, bicycles, any other mobile structure, and the like. "Transport components" as used in this disclosure are objects that are moved between two or more locations. Transport components may include cargo. Transport components may include, without limitation, construction materials, electronics, perishables, food, consumer goods, clothes, industrial equipment, parcels, freight shipments, and the like.

Still referring to FIG. 1, in some embodiments, transport data may include transport component data. "Transport component data" as used throughout this disclosure is information pertaining to objects of a transport. Transport component data may include, without limitation, dimensions such as height, width, length, volume, and the like. Transport component data may include, without limitation, values of components, costs associated with transporting components, and the like. For instance, and without limitation, transport component data of transport data may include a value of $510.27 for a package of apples in bulk. In some embodiments, transport component data may include one or more transport component statuses. A "transport component status" as used in this disclosure is a condition of a transport component. A transport component status may include, without limitation, hazardous material, frangible, damaged, and/or other conditions. In some embodiments, transport data may include one or more transport characteristics. A "transport characteristic", as used in this disclosure, is an attribute relating to a transport. Transport characteristics may include, without limitation, expedited, overnight, freight, parcel, international, domestic, land, sea, air, and the like. In some embodiments, apparatus 100 may use a transport characteristic classifier to classify transport to one or more transport characteristic categories. A transport characteristic classifier may be trained with training data correlating transport data to transport characteristic groupings, such as, without limitation, freight, expedited, hazardous, parcel, international, domestic, land, sea, air, overnight, and the like. Training data may be received from an external computing device, user input, and/or previous iterations of processing. A transport characteristic classifier may be configured to input transport data and categorize transport and/or transport components of transport to one or more characteristics groupings.

Still referring to FIG. 1, transport data may be received through a user input. In some embodiments, apparatus 100 may receive transport data from one or more external computing devices, such as without limitation servers, desktops, smartphones, tablets, and the like. "User input", as used in this disclosure, is a form of data entry received from an individual and/or group of individuals. User input may include, but is not limited to, text input, engagement with icons of a graphical user interface (GUI), and the like. Text input may include, without limitation, entry of characters, words, strings, symbols, and the like. In some embodiments, user input may include one or more interactions with one or more elements of a graphical user interface (GUI), such as GUI. A "graphical user interface" as used in this disclosure is an interface that includes one or more pictorial and/or graphical icons corresponding to one or more computer actions. In one or more embodiments, GUI may be implemented to show information in an organized format. For instance, and without limitation, GUI may show various information related to transport. For example, and without limitation, GUI may show a user a progression, status, or stage of transport. In another example, and without limitation, GUI may show a history of transport. For example, and without limitation, GUI may include a list of prior locations of transport vehicle or a real-time tracking (e.g., map showing movement of goods along transport route). In another example, and without limitation, GUI may show a list of objects or goods being moved during transport. In other embodiments, GUI may show comments from a user. For instance, and without limitation, GUI may show a comment from a client (e.g., needed time of delivery or commentary or frangibility of a good) or transportation entity (e.g., required stops, delays, recommended route changes or transport characteristic changes). GUI may include textual representations of information related to transport or visual (e.g., images or illustrations) representations of information related to transport. For instance and without limitation, GUI may include editable or non-editable maps, lists, icons, images, charts, and the like.

Still referring to FIG. 1, entity process may include manufacturing data. As used in this disclosure, "manufacturing data" is information pertaining to manufacturing. Manufacturing data may include, without limitation, geographical data, estimated completion times, estimated costs, and the like. Geographical data may include, without limitation, GPS coordinates, number of orders, and the like. In some embodiments, geographical data may include relative location data. As used in this disclosure, "manufacturing", is a production of a product. For instance, and without limitation, a manufacturing may include one or more processes of building a product such as forming a singular piece from multiple pieces using manufacturing methods. "Manufacturing components" as used in this disclosure are objects that are moved between two or more locations. Manufacturing components may include cargo. Manufacturing components may include, without limitation, construction materials, electronics, perishables, food, consumer goods, clothes, industrial equipment, parcels, freight shipments, and the like.

Still referring to FIG. 1, processor 108 may utilize a machine learning model 120 to output growth factor 116. In some embodiments, machine learning model 120 may be trained utilizing training data 124. In some embodiments, training data 124 may include historical business data from various businesses producing a same or similar product. As used in this disclosure, "historical business data" is information regarding business operations from third-party sources. Historical business data may include, but is not limited to, revenue, expenses, profit, margins, or the like. In some embodiments, historical business data may be from an entity distinct from the entity as discussed above. In some embodiments, training data 124 may include organizational pattern data. As used in this disclosure, "organizational pattern data" is information pertaining to entity behaviors over a time interval. In some embodiments, organizational pattern data may be pertaining to pattern data collected daily, weekly, monthly, quarterly, yearly, or the like.

Still referring to FIG. 1, growth factor 116 may be represented as a numerical score numerical score or a linguistic value. Growth factor 116 may be represented as a score used to reflect a current growth status of an entity. A non-limiting example, of a numerical scale, may include a scale from 1-10, 1-100, 1-1000, and the like, wherein a rating of 1 may represent a user with critical growth conditions, whereas a rating of 10 may represent a thriving entity. Examples of linguistic values may include, "Critical status," "Poor status," "Average status," "Good health," "Excellent status," and the like. In some embodiments, a numerical score range may be represented by a linguistic value. As used in the current disclosure, a "numerical score range" is a range of scores that are associated with a linguistic value. For example, this may include a score of 0-2 representing "Critical status" or a score of 8-10 representing "Excellent status." A user's physical health may be scored by classifying the current user data 112 to examples of user data from third parties who are similarly situated by entity size, revenue, and the like.

With continued reference to FIG. 1, a numerical score range representing physiological data may be adjusted using linguistic values. Processor 108 may adjust the numerical score range according to the severity of the disease or condition associated. Alternatively, processor 108 may adjust the numerical score range to indicate the impact the disease or condition will have on the user's lifespan. A numerical score range may be determined by comparing the current diseases or conditions of the user to previous iterations of the numerical score ranges. Previous iterations' numerical score ranges may be taken from entities who are similarly situated to the current entity. Previous iterations of a numerical score range may be received from database. A numerical score range may be generated using a range machine learning model. As used in the current disclosure, a "range machine-learning model" is a machine-learning model that sorts inputs into categories or bins of data, outputting the categories or bins of data and/or labels associated therewith. The range machine-learning model may be consistent with the classifier described below. Inputs to the range machine-learning model may include entity profile 112, scaling factor 116, and the like. Outputs to the range machine-learning model may include a numerical score range. Range training data is a plurality of data entries containing a plurality of inputs that are correlated to a plurality of outputs for training a processor by a machine-learning process to correlate physiological data to examples of numerical score ranges. Range training data may be received from database. Range training data may contain information about entity profile 112, scaling factor 116, examples of numerical score ranges, and the like. Range training data may be configured to correlate physiological data to examples of numerical score ranges. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, any data as described in this disclosure (e.g., user data, at least an activity) may be represented as a vector. As used in this disclosure, "vector" is a data structure that represents one or more quantitative values. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 3, 4]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

Still referring to FIG. 1, a database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, entity data 112, growth factor 116, transport data, manufacturing data, organizational pattern data, or any data described in this disclosure may be represented as vectors. Representing data as vectors may be advantageous for various operations. As a non-limiting example, a degree of similarity between entity data 112, growth factor 116, transport data, manufacturing data, organizational pattern data, or any other data described in this disclosure. One of ordinary skill in the art, upon reading this disclosure, would be knowledgeable of the various vector operations that may be performed by representing data as a vector.

Still referring to FIG. 1, processor 108 may utilize a scoring function expressed as a risk function representing an "expected loss" of an algorithm relating inputs to outputs, where loss is computed as an error function representing a degree to which a prediction generated by the relation is incorrect when compared to a given input-output pair provided in training data. In some instances, training data may include growth factor correlated to at least an interface element 128. In some instances, training data may include growth factor provided by a third-party source. In some instances, third-party source may be tangentially associated with entity. As a non-limiting example, third-party source may be a separate entity that shares a degree of similarity, above a threshold, with entity data 112.

Still referring to FIG. 1, processor 108 may generate at least an interface element 128. Processor 108 may transmit the at least an interface element 128 to display 132. In some instances, display may be a graphical user interface (GUI). In some embodiments, display 132 may include, but it is not limited to, a liquid crystal display (LCD), a cathode ray tube (CRT), a plasma display, a light emitting diode (LED) display, and any combinations thereof. Display 132 may be utilized in combination with processor 108 to provide graphical representations of aspects of the present disclosure. In some embodiments, at least an interface element 128 may be selected from a library of interface elements. In some instances, interface element library may be sorted into categories. Processor 108 may select at least an interface element that is closely associated with growth factor 116. As a non-limiting example, each interface element may have a vector representation. Vector representation of each interface element may be compared to growth factor vector representation for a degree of similarity. Interface element with the highest degree of similarity may be selected.

Still referring to FIG. 1, generating generate at least an interface element 128 may include a template. Template may be a border or an entire interface itself. In some embodiments, at least an interface element 128 may include a push notification. In some instances, push notification may be displayed on display 132. In some instances, display 132 may include a graphical user interface (GUI) configured to receive user inputs. User may interact with push notifications via GUI.

Still referring to FIG. 1, processor 108 may transmit the at least an interface element 128 to display 132. In some instances, display may be a GUI. In some embodiments, display 132 may include, but it is not limited to, a liquid crystal display (LCD), a cathode ray tube (CRT), a plasma display, a light emitting diode (LED) display, and any combinations thereof. Display 132 may be utilized in combination with processor 108 to provide graphical representations of aspects of the present disclosure.

Still referring to FIG. 1, processor 108 may transmit at least an interface element 128 to display 132 via a wired connection and/or a wireless connection. Wired connection transmission may include direct connection between processor and display. In some instances, wired connection may include intermediate relays disposed on a transmission pathway. In some embodiments, data structure that includes at least an interface element 128 to be displayed may need to be pre-processed prior to display. As a non-limiting example, at least an interface element 128 data may have a dither applied. As used in this disclosure, "dither" is an applied form of noise used to randomize quantization error, preventing large-scale patterns such as color banding in images. In some instances, dithering may be performed at processor 108 prior to transmission. In another embodiment, dither may occur at another hardware portion of apparatus 100. Total transmission from processor 108 to display may take longer if at least an interface element 128 data is transmitted from processor 108 to another hardware unit, then to display 132 than if it were direct.

Still referring to FIG. 1, processor 108 may transmit at least an interface element 128 data to display 132 and receive a return signal. In some embodiments, return signal may contain a same number of packets as the initial transmission. In some embodiments, return signal may have a percent loss of data packets. Percent loss of data packets may be required to be below a threshold (e.g., 30%, 10%, 6%) to confirm transmission. In some instances, percent loss may be above a threshold percent loss. Processor 108 may resend at least an interface element 128 data signal upon determining that percent loss is above a threshold percent loss. In some embodiments, processor 108 may transmit an error signal to display 132 in response to determining that percent loss is above a percent loss threshold. It should be noted that error signal may include a substantially smaller packet count than at least an interface element 128 data signal. Advantageously, error signal may rarely experience transmission errors. In some embodiments, processor 108 may determine an additional error in transmitting error signal, using methods as described above.

Figure 2:
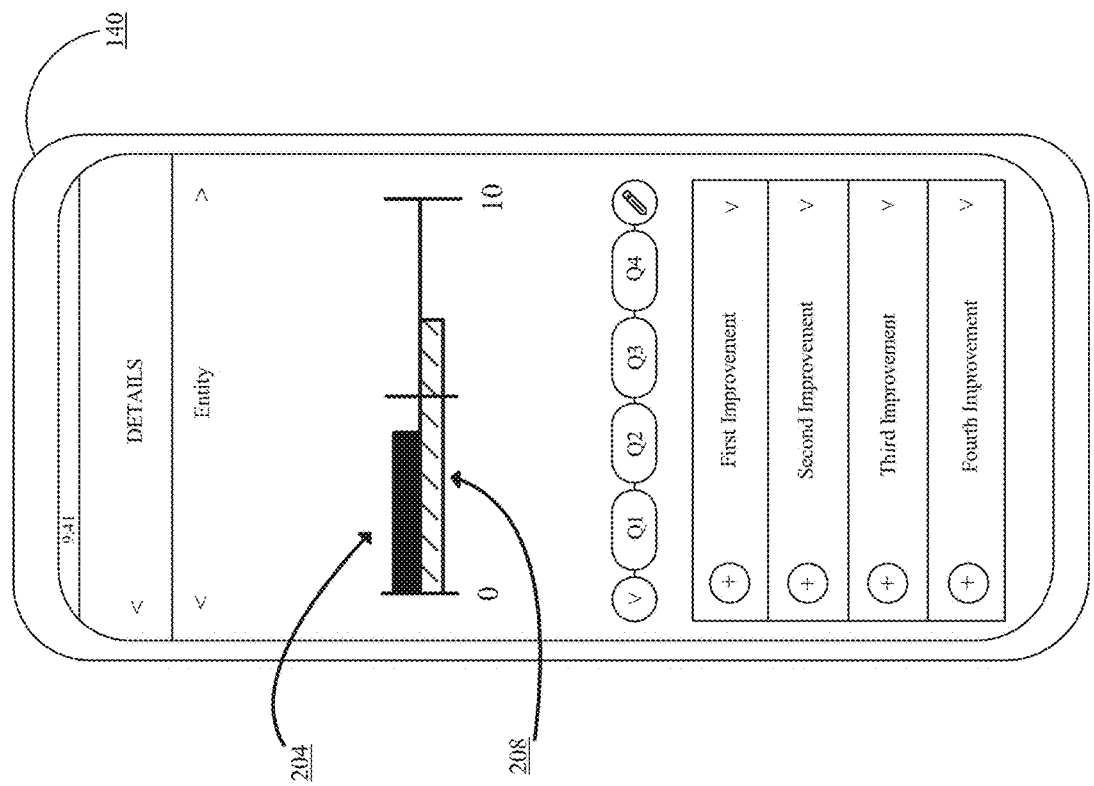
FIG. 2 is illustrative embodiment of a user interface.

Referring now to FIG. 2, display 140 may display growth factor 116 as geometrical depiction. As used in this disclosure, a "geometrical depiction" is a graph, chart, or the like. As a non-limiting example, display 140 may display a number line that includes growth factor 204 compared to an industry standard 208. In some embodiments, number line may be color coordinated. Display 140 may include one or more toggle options. Toggle options may be disposed on any portion of display 140. In some embodiments, toggle options may be associated with one or more "what-if" scenarios. As used in this disclosure, "what-if scenarios" are predicted outcomes when at least a recommendation is performed by entity. For example, modified user schedule may include spending more time at the studio. Display 140 may include toggle options for each fiscal quarter (Q1, Q2, Q3, Q4). As a non-limiting example, display 140 may include at least an interface element that depicts a graph showing entity's progression over time. In some instances, progression may be measured by revenue, it may be measured by profit, or things of the like. It should be noted that, in some instances, processor 108 may generate multiple recommendations. Recommendations may include suggestions to mitigate the growth factor such as budget cuts, workforce restructuring, or things of the like. Each recommendation may have a toggle option to show each predicted outcome of performing the associated recommendation.

Still referring to FIG. 2, number line may be on a 1-10 scale. In some embodiments number line may be on a 1-100 scale. In some instances, the scale may change as a function of a toggle option. For example, scale may change from 1-10 to 1-100 as a function of toggling first improvement. In some embodiments, changing the quarter (e.g., Q1 to Q2) may cause a change in scale. In some embodiments, growth factor 204 and industry standard may change as a function of toggling an option. For example, togging second improvement may increase growth factor 204 while industry standard 208 remains the same. In some instances, industry standard 208 may also change with a toggled option.

Figure 3:
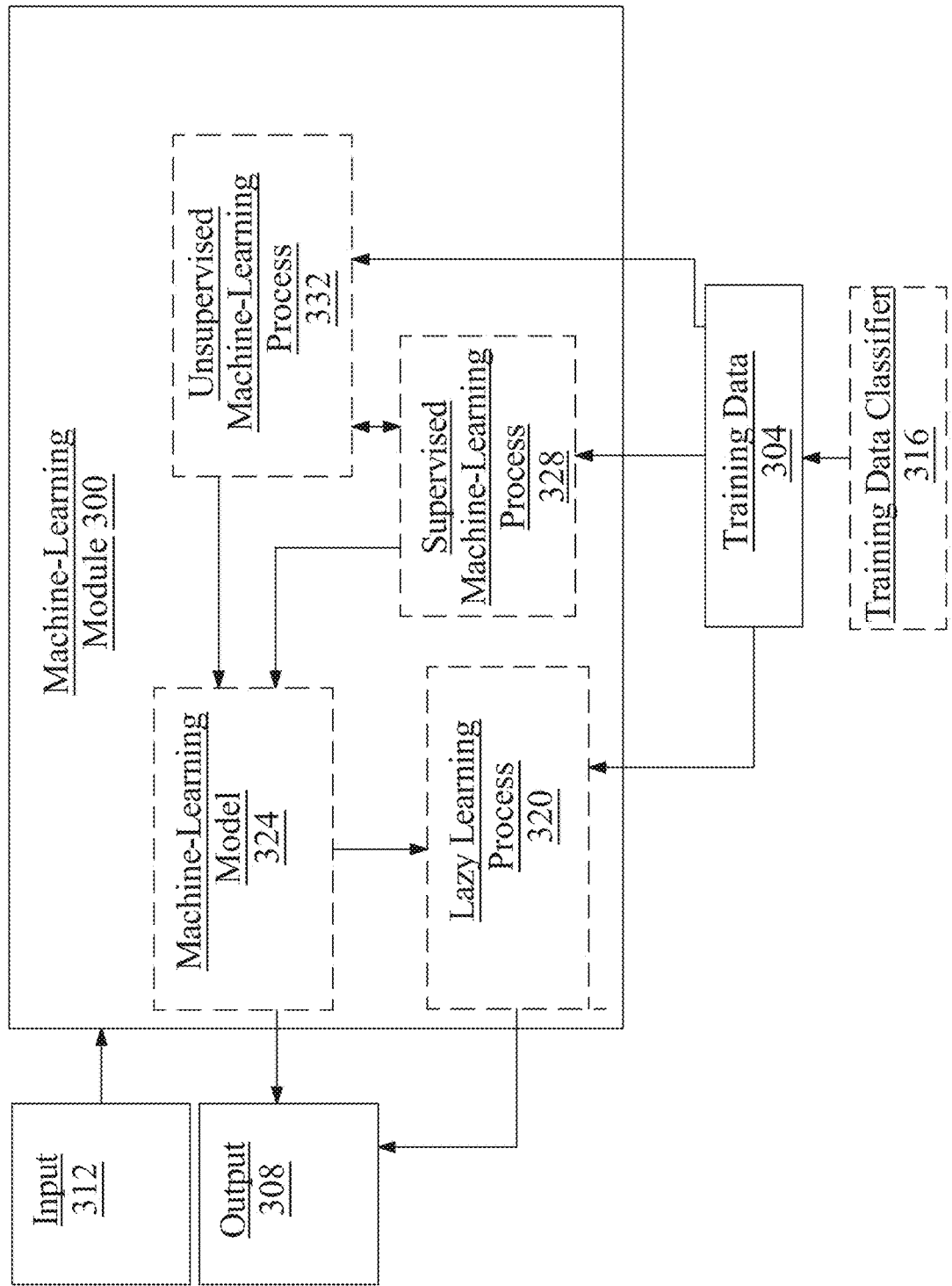
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to an age group, a socioeconomic class, race, ethnicity, or the like.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure and outputs and as described in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
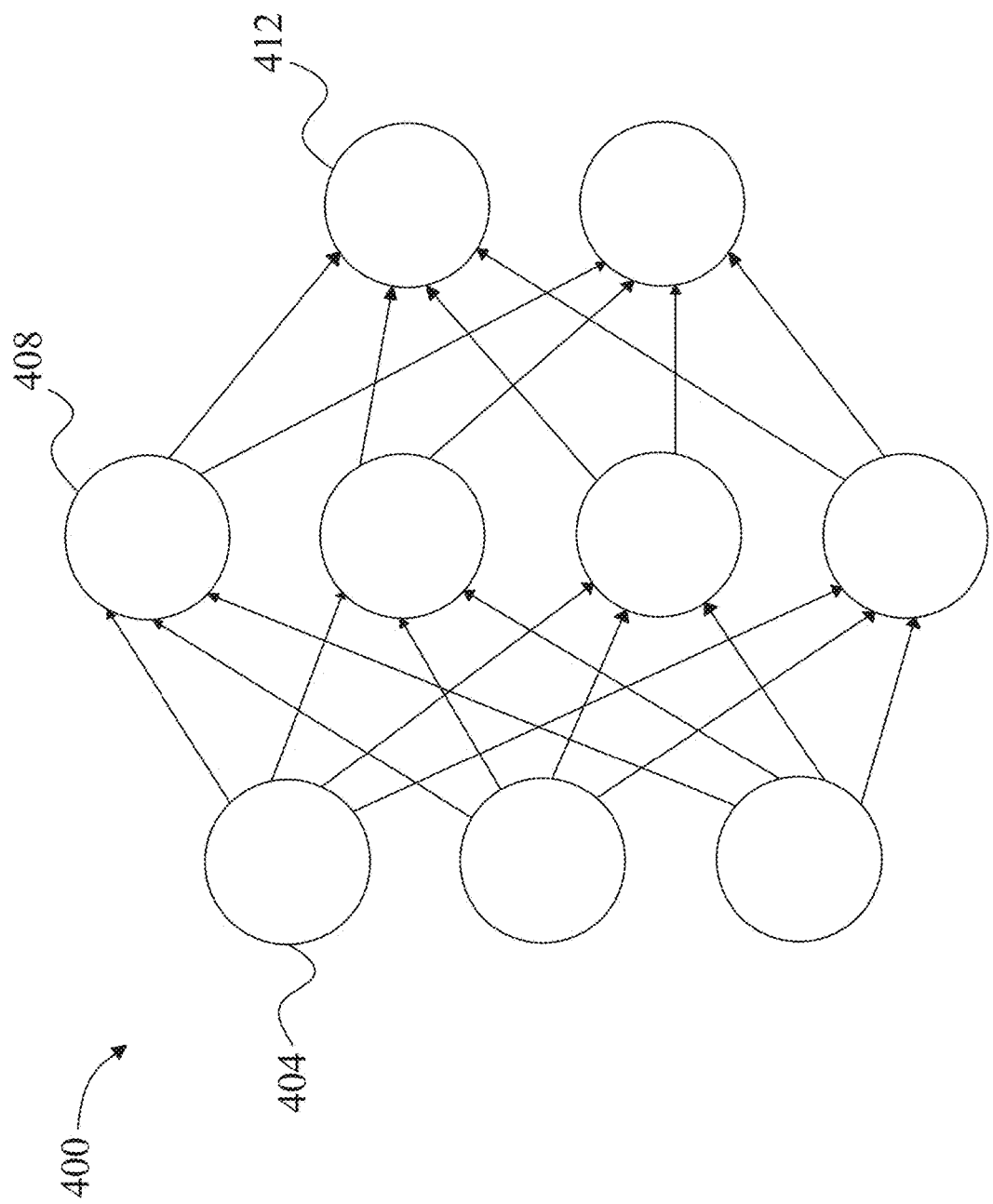
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
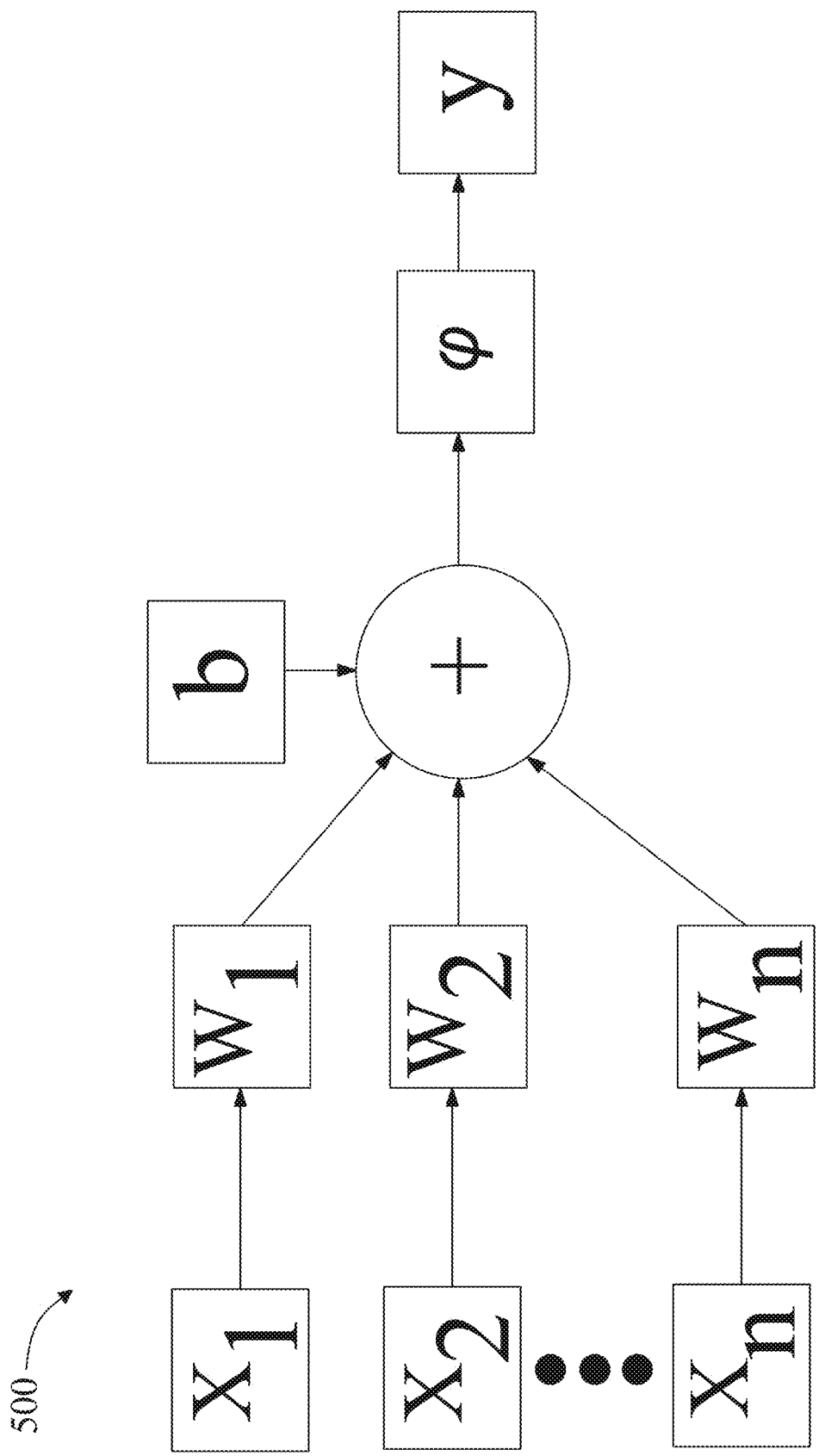
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
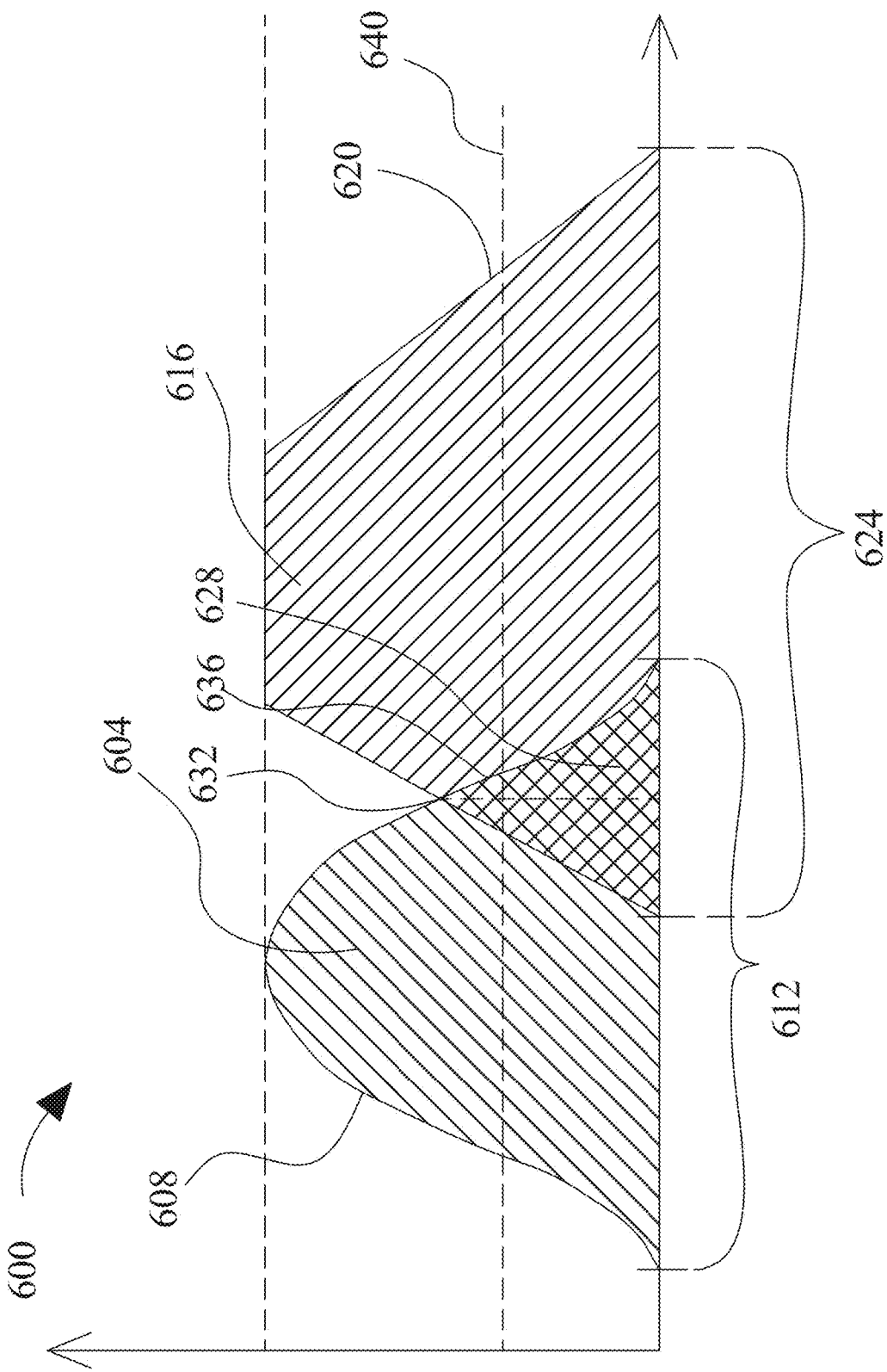
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, entity data 112, growth factor 116, transport data, manufacturing data, organizational pattern data, such as without limitation of recommendation. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or entity data 112, growth factor 116, transport data, manufacturing data, organizational pattern data, such as without limitation recommendation categorization, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify entity data 112, growth factor 116, transport data, manufacturing data, organizational pattern data. For instance, if an entity has a fuzzy set matching entity data 112 and growth factor 116 fuzzy set by having a degree of overlap exceeding a threshold, processor 108 may classify, entity data 112 and growth factor 116 as belonging to the achievable categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, an entity data 112 and growth factor 116 may be compared to multiple recommendation categorization fuzzy sets. For instance, entity data 112 and growth factor 116 may be represented by a fuzzy set that is compared to each of the multiple recommendation categorization fuzzy sets; and a degree of overlap exceeding a threshold between the entity data 112 and growth factor 116 fuzzy set and any of the multiple recommendation categorization fuzzy sets may cause processor 108 to classify the entity data 112 and growth factor 116 as belonging to achievable categorization. First growth factor 116 categorization may have a first fuzzy set; second growth factor 116 categorization may have a second fuzzy set. Processor 108, for example, may compare at least an interface element fuzzy set with each of recommendation categorization fuzzy set and in recommendation categorization fuzzy set, as described above, and classify entity data 112 and growth factor 116 class to either, both, or neither of recommendation categorization nor in recommendation categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, entity data 112 and growth factor 116 may be used indirectly to determine a fuzzy set, as entity data 112 and growth factor 116 fuzzy set may be derived from outputs of one or more machine-learning models that take the entity data 112 and growth factor 116 directly or indirectly as inputs.

Still referring to FIG. 6, a computing device may use a logic comparison program, such as, but not limited to, a fuzzy logic model to determine a recommendation response. An recommendation response may include, but is not limited to, very unlikely, unlikely, likely, and very likely, and the like; each such recommendation response may be represented as a value for a linguistic variable representing recommendation response or in other words a fuzzy set as described above that corresponds to a degree of matching as calculated using any statistical, machine-learning, or other method that may occur to a person skilled in the art upon reviewing the entirety of this disclosure. In other words, a given element of entity data 112 and growth factor 116 may have a first non-zero value for membership in a first linguistic variable value such as "very likely" and a second non-zero value for membership in a second linguistic variable value such as "very unlikely" In some embodiments, determining a recommendation categorization may include using a linear regression model. A linear regression model may include a machine learning model. A linear regression model may be trained using a machine learning process. A linear regression model may map statistics such as, but not limited to, quality of entity data 112, growth factor 116, transport data, manufacturing data, organizational pattern data. In some embodiments, determining a recommendation of entity data 112 and growth factor 116 may include using a recommendation classification model. A recommendation classification model may be configured to input collected data and cluster data to a centroid based on, but not limited to, frequency of appearance, linguistic indicators of quality, and the like. Centroids may include scores assigned to them such that quality of entity data 112 and growth factor 116 may each be assigned a score. In some embodiments recommendation classification model may include a K-means clustering model. In some embodiments, recommendation classification model may include a particle swarm optimization model. In some embodiments, determining the recommendation of an entity data 112 and growth factor 116 may include using a fuzzy inference engine. A fuzzy inference engine may be configured to map one or more entity data 112 and growth factor 116 data elements using fuzzy logic. In some embodiments, entity data 112 and growth factor 116 may be arranged by a logic comparison program into recommendation arrangement. A "recommendation arrangement" as used in this disclosure is any grouping of objects and/or data based on skill level and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given degree of matching level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to image data, at least an activity, verifier location, network latency, such as a degree of matching of an element, while a second membership function may indicate a degree of in recommendation of a subject thereof, or another measurable value pertaining to image data, at least an activity, verifier location, network latency. Continuing the example, an output linguistic variable may represent, without limitation, a score value. An inference engine may combine rules, such as: "if image is likely this verifier, device is highly likely the verifier's device, location is likely correct, and network latency is likely correct, then verifier is highly likely to be identified"—the degree to which a given input function membership matches a given rule may be determined by a triangular norm or "T-norm" of the rule or output membership function with the input membership function, such as min (a, b), product of a and b, drastic product of a and b, Hamachi product of a and b, or the like, satisfying the rules of commutativity ($T(a, b)=T(b, a)$), monotonicity: ($T(a, b) \leq T(c, d)$ if $a \leq c$ and $b \leq d$), (associativity: $T(a, T(b, c))=T(T(a, b), c)$), and the requirement that the number 1 acts as an identity element. Combinations of rules ("and" or "or" combination of rule membership determinations) may be performed using any T-conorm, as represented by an inverted T symbol or "$\perp$," such as max(a, b), probabilistic sum of a and b ($a+b-a*b$), bounded sum, and/or drastic T-conorm; any T-conorm may be used that satisfies the properties of commutativity: $\perp(a, b)=\perp(b, a)$, monotonicity: $\perp(a, b) \leq \perp(c, d)$ if $a \leq c$ and $b \leq d$, associativity: $\perp(a, \perp(b, c))=\perp(\perp(a, b), c)$, and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 6, entity data 112 and growth factor 116 to be used may be selected by user selection, and/or by selection of a distribution of output scores, such as 100% very likely, 100% very unlikely, or the like. Each recommendation categorization may be selected using an additional function such as in recommendation as described above.

Figure 7:
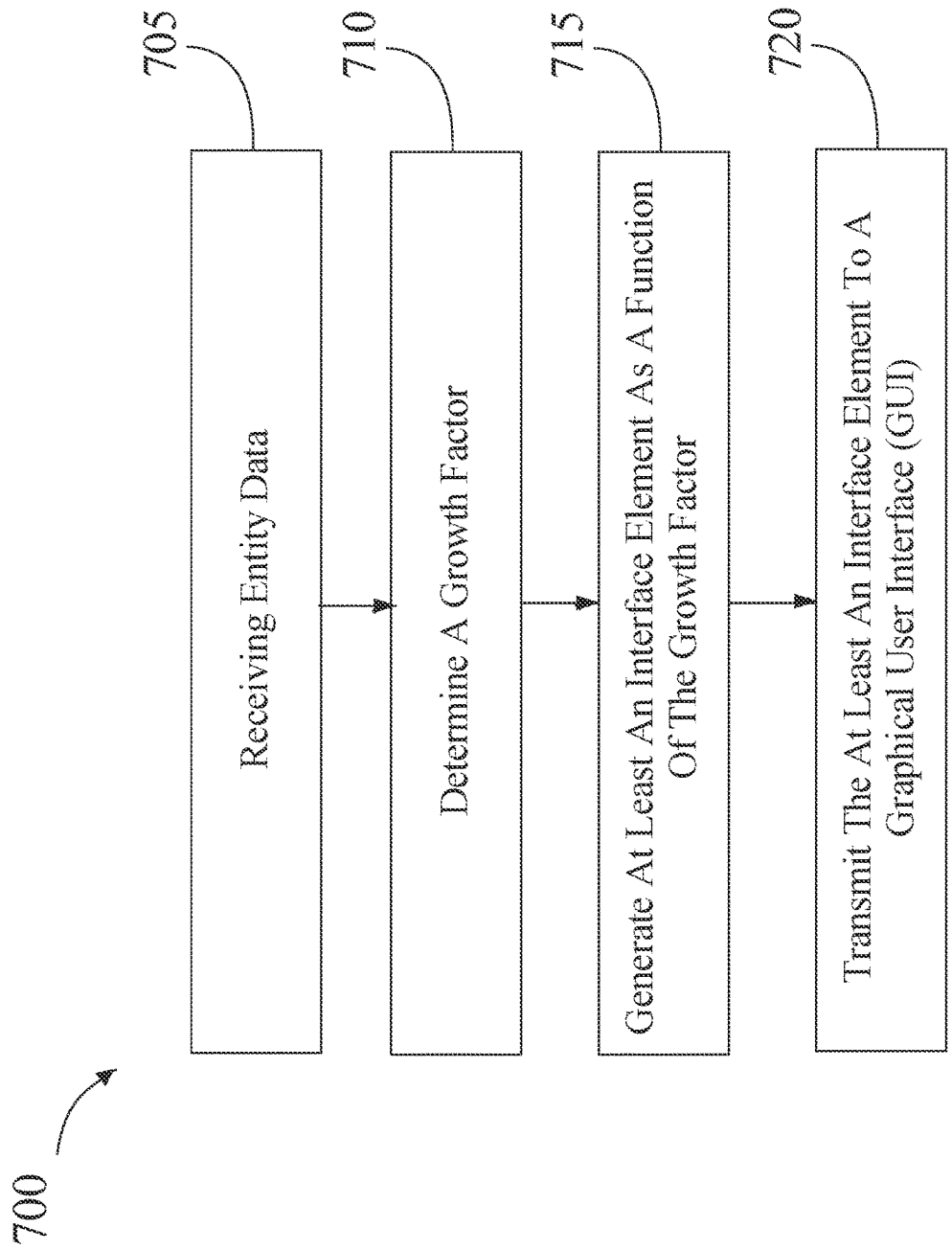
FIG. 7 is a flow diagram of an exemplary method for determining a growth factor.

Referring to FIG. 7, an exemplary method 700 for determining a growth factor. Method 700 includes a step 705, receiving, by a processor, entity data. In some embodiments, the entity data comprises image data. In some embodiments, the image data comprises processed image data, and wherein processing the image data comprises up sampling the image data to a desired pixel count. In some embodiments, the image data comprises processed image data, and wherein processing the image data comprises down sampling the image data to a desired pixel count. This may occur as described above in reference to FIGS. 1-5.

With continued reference to FIG. 7, method 700 includes a step 710 of determining, by the processor, a growth factor. In some embodiments, determining the growth factor comprises utilizing a machine-learning model. In some instances, the machine-learning model utilizes training data to train the machine-learning model, wherein the training data comprises historical entity data correlated to a historical growth factor. In some embodiments, the machine-learning model is trained iteratively. This may occur as described above in reference to FIGS. 1-5.

With continued reference to FIG. 7, method 700 includes a step 715 generating, by the processor, at least an interface element as a function of the growth factor. This may occur as described above in reference to FIGS. 1-5.

With continued reference to FIG. 7, method 700 includes a step 720 of transmitting, by the processor, the at least an interface element to a graphical user interface (GUI). In some embodiments, transmitting the at least an interface element comprises satisfying a percent loss threshold. In some embodiments, the percent loss threshold comprises a data packet percent loss threshold. In some embodiments, transmitting the at least an interface element comprises receiving an error signal. This may occur as described above in reference to FIGS. 1-5.

It is to be noted that any one or more of the aspects and embodiments described herein may be conveniently implemented using one or more machines (e.g., one or more computing devices that are utilized as an entity computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
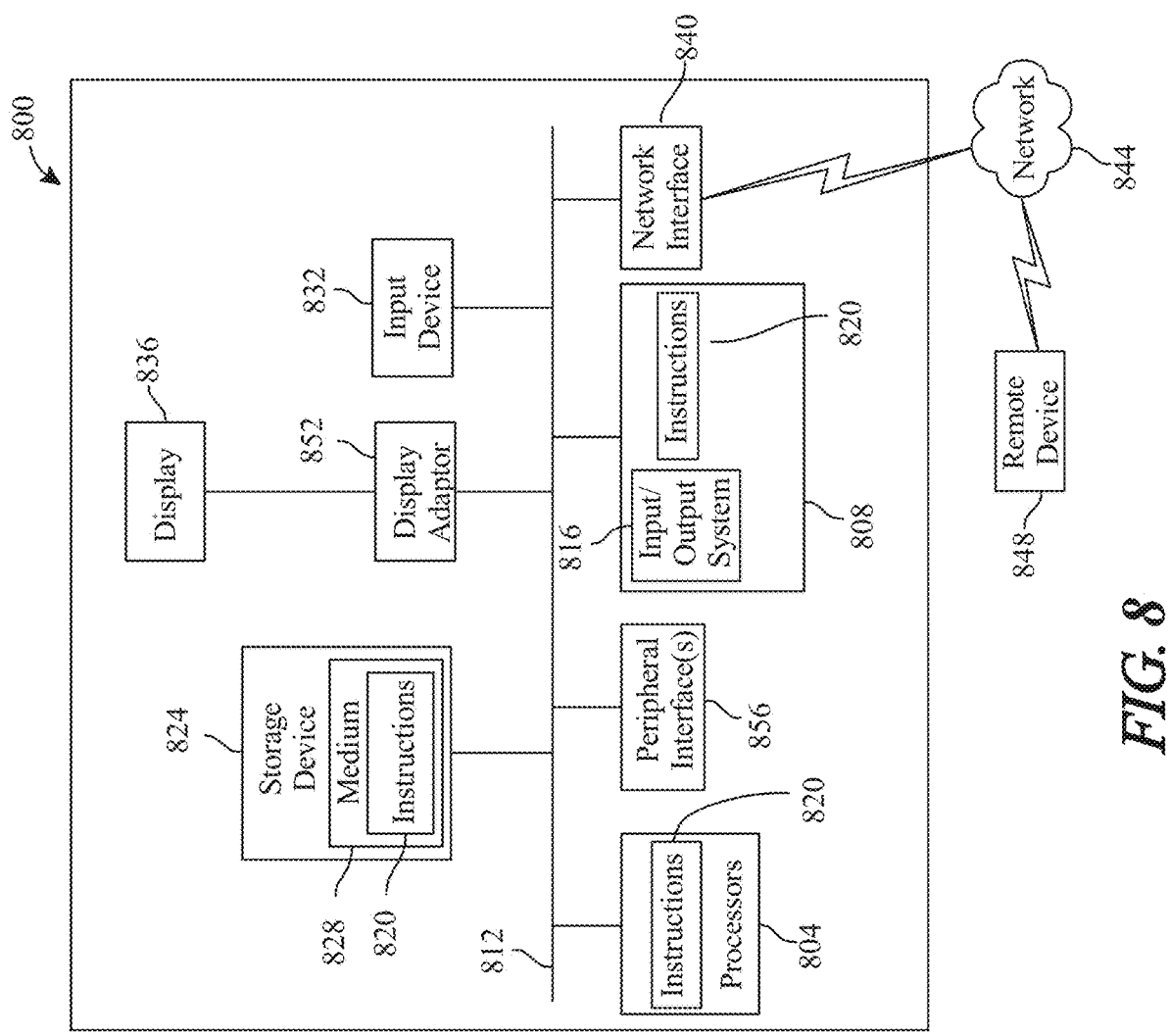
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for determining a growth factor, the apparatus comprising:
    at least a processor; and
    a memory communicatively connected to the at least a processor, the memory containing instructions configuring the at least a processor to:
    receive entity data for an entity;
    determine a growth constraint profile comprising at least one characteristic affecting a growth ability of the entity and a temporal element, wherein the temporal element is a measure of historical time, and wherein determining the growth constraint profile comprises:
        utilizing a machine learning model configured to receive the entity data as an input and output the growth factor comprising the at least one characteristic;
    generate a plurality of strategy data as a function of the growth constraint profile;
    generate at least an interface element as a function of the growth factor and the plurality of strategy data; and
    transmit the at least an interface element to a graphical user interface (GUI), wherein the GUI configures a user device to generate a field associated with the growth factor and the plurality of strategy data.

2. The apparatus of claim 1, wherein the entity data comprises image data.

3. The apparatus of claim 2, wherein the image data comprises processed image data, and wherein processing the image data comprises upsampling the image data to a desired pixel count.

4. The apparatus of claim 2, wherein the image data comprises processed image data, and wherein processing the image data comprises down sampling the image data to a desired pixel count.

5. The apparatus of claim 1, wherein determining the growth factor comprises representing the entity data and the growth factor as vectors, respectively, and determining a degree of similarity between an entity data vector and a growth factor vector.

6. The apparatus of claim 1, wherein utilizing the machine-learning model comprises utilizing training data to train the machine-learning model, wherein the training data comprises historical entity data correlated to a historical growth factor.

7. The apparatus of claim 6, wherein the machine-learning model is trained iteratively.

8. The apparatus of claim 1, wherein transmitting the at least an interface element comprises satisfying a percent loss threshold.

9. The apparatus of claim 8, wherein the percent loss threshold comprises a data packet percent loss threshold.

10. The apparatus of claim 8, wherein transmitting the at least an interface element comprises receiving an error signal.

11. A method for determining a growth factor, the method comprising:
    receiving, by a processor, entity data;
    determining, by the processor, a growth constraint profile comprising at least one characteristic affecting a growth ability of the entity and a temporal element, wherein the temporal element is a measure of historical time, wherein determining the growth constraint profile comprises utilizing a machine learning model configured to receive the entity data as an input and output the growth factor comprising the at least one characteristic;
    generate a plurality of strategy data as a function of the growth constraint profile;
    generating, by the processor, at least an interface element as a function of the growth factor and the plurality of strategy data; and
    transmitting, by the processor, the at least an interface element to a graphical user interface (GUI).

12. The method of claim 11, wherein receiving the entity data comprises receiving image data.

13. The method of claim 12, wherein receiving the image data further comprises receiving processed image data, and wherein processing the image data comprises upsampling the image data to a desired pixel count.

14. The method of claim 12, wherein receiving the image data comprises receiving processed image data, and wherein processing the image data comprises down sampling the image data to a desired pixel count.

15. The method of claim 11, wherein determining the growth factor comprises representing the entity data and the growth factor as vectors, respectively, and determining a degree of similarity between an entity data vector and a growth factor vector.

16. The method of claim 15, wherein utilizing the machine-learning model comprises utilizing training data to train the machine-learning model, wherein the training data comprises historical entity data correlated to a historical growth factor.

17. The method of claim 16, wherein training the machine-learning model further comprises training the machine-learning model iteratively.

18. The method of claim 11, wherein transmitting the at least an interface element comprises satisfying a percent loss threshold.

19. The method of claim 18, wherein satisfying the percent loss threshold comprises satisfying a data packet percent loss threshold.

20. The method of claim 18, wherein transmitting the at least an interface element comprises receiving an error signal.

* * * * *